J. C. GRANT.
LIQUID RAISING APPARATUS.
APPLICATION FILED NOV. 14, 1919.
1,358,632.
Patented Nov. 9, 1920.
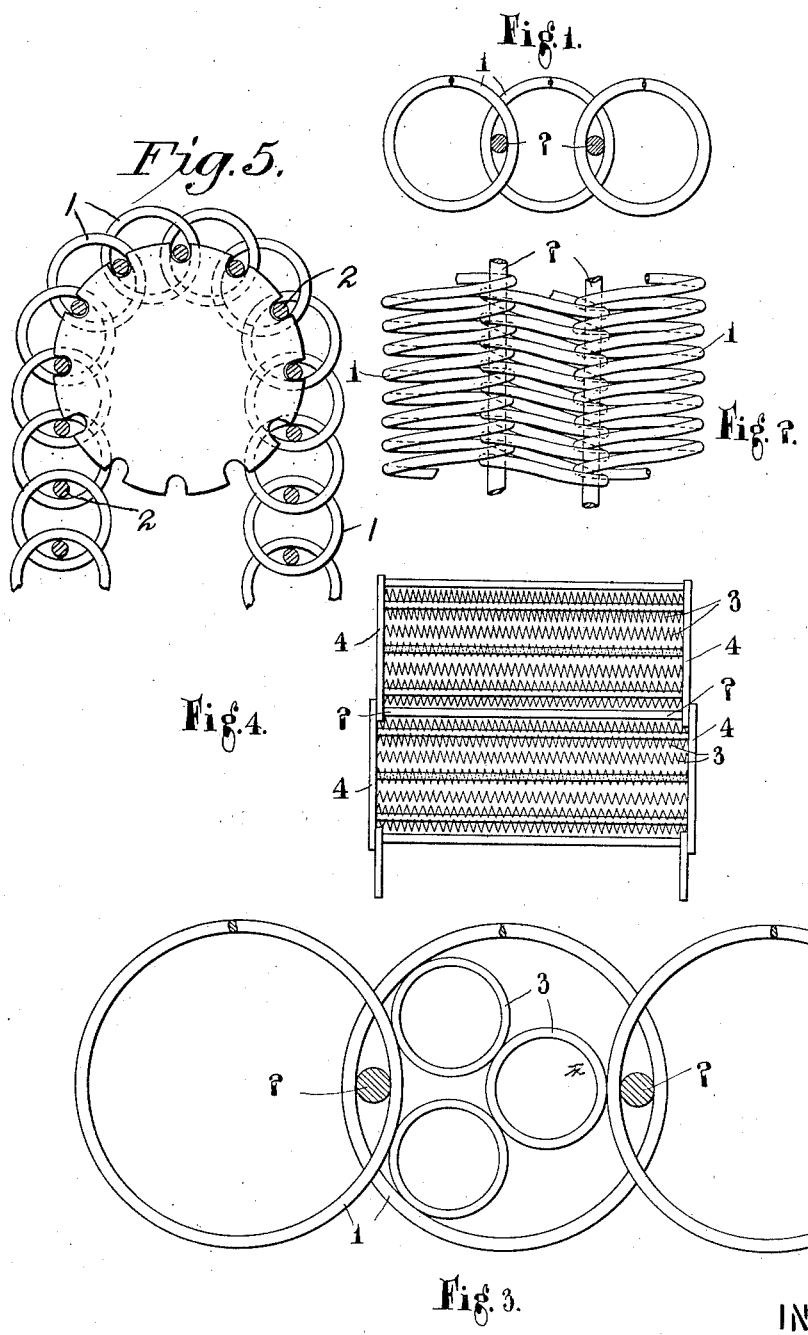
INVENTOR
J. C. Grant.
BY
H. R. Kerslake ATTORNEY

UNITED STATES PATENT OFFICE.

JOHN CAMERON GRANT, OF BARNES, ENGLAND.

LIQUID-RAISING APPARATUS.

1,358,632.　　　　Specification of Letters Patent.　　Patented Nov. 9, 1920.

Application filed November 14, 1919. Serial No. 337,939.

*To all whom it may concern:*

Be it known that I, JOHN CAMERON GRANT, a subject of the King of Great Britain and Ireland, and residing at Holly Lodge, The Terrace, Barnes, in the county of Surrey, England, have invented certain new and useful Improvements in and Relating to Liquid-Raising Apparatus, of which the following is a specification.

This invention relates to chains for use in apparatus for raising liquids of the type in which an endless element is passed through the liquid which is thereby drawn up with the ascending portion of the chain or the like employed. Such apparatus is described in British specifications Nos. 21844 and 23735 of 1914 but the present invention is not to be regarded as confined to the apparatus therein described.

Chains have been proposed comprising interengaging helices arranged at right angles to the length of the chain, between two longitudinally placed helices; I have found, however, that with such a chain there is, owing to the cumulative effect of each transverse helix, a tendency for the chain as a whole to twist.

The object of the present invention is to obviate this difficulty and to produce a chain which will lie flat and run easily over its supporting pulley or the like.

The invention consists in a chain for liquid raising apparatus of the type set forth comprising a series of interengaging helices wound alternately right and left handedly and arranged with their axes at right angles to the length of the chain.

The invention also consists in a chain for liquid raising apparatus of the type set forth consisting of interengaging helices wound alternately right and left disposed with their axes at right angles to the length of the chain and connected by pins which are passed through the overlapping portions of adjoining helices.

The invention further consists in utilizing portions of the pins projecting on each side of the chain to engage a driving sprocket wheel.

The invention moreover consists in placing within the main helices forming the chain auxiliary helices or other members partially to fill the spaces within the main helices.

The invention still further consists in the improved chains for liquid raising apparatus of the type set forth, hereinafter described.

In the accompanying drawings, which illustrate various chains constructed according to this invention;

Figure 1 is a cross section of the simplest form of chain, and

Fig. 2 is a plan thereof.

Figs. 3 and 4 illustrate two modifications.

Fig. 5 shows the method of driving the chain.

In making the form illustrated in Figs. 1 and 2, I wind a number of helices 1 of wire or of its equivalent of any suitable section, the helices being of circular or of any other desired cross-section. These are then assembled by inserting one helix partially into an adjoining helix, their axes being parallel and at right angles to the length of the chain. A pin 2 is then inserted in the space inclosed by two adjoining helices and is secured against lateral displacement by any suitable means such as a split pin inserted through the main securing pin just outside each end of the helices through which it is passed.

Obviously other means may be employed to effect this purpose, such, for example, as connecting the securing pins together by flexible links or by bending the pins or by winding the ends of the wire around or partially around or threading them through the pins.

The pins are allowed to project a certain distance beyond the ends of the helices in order that as indicated in Fig. 5 they may engage suitably arranged sprocket wheels which serve to drive the chain. If it be preferred the chains may be driven without projecting pins or sprocket wheels simply by friction with the pulley over which they run.

Half the helices are wound right and half left-handedly, the helices of opposite hands being arranged alternately in order to obviate the resultant longitudinal twist in the chain which would occur were only helices of one hand used.

I may, if found desirable, attach the helices together or to the securing pins by binding wires or in any other suitable manner.

In another construction of chain it is possible to omit the pins 2, the links being interconnected by causing the turns of the helices themselves to engage one another. This is brought about by a screwing motion of each helix with regard to the one preceding it in the chain.

While chains constructed after one or other of the various types above described are extremely efficient when made in the smaller sizes it is found that above a certain diameter of helix the amount of liquid raised under given conditions does not increase proportionately with increase in diameter of the helices. This may be due to the fact that in the case of the larger diameters considering the cross-section of a single helix there is a comparatively large area unoccupied by any portion of the chain. The liquid therefore, (especially if its viscosity be not great) is unable to bridge this area and consequently the column of liquid traveling with the chain is more or less hollow or full of air bubbles.

In order to overcome this objection I have devised the form of chain shown in Fig. 3. In this construction the main helices 1 are of comparatively large diameter and serve to support and inclose a number of smaller helices 3 placed with their axes parallel to those of the larger helices. The size of each of these smaller helices is such that there is no clear space left within each main helix greater than can be bridged by the liquid to be raised, the size of the auxiliary helices being determined by the viscosity of the liquid to be dealt with and by other conditions of operation.

The helices may be connected together and to the main helix by binding wire or in any other suitable manner in order to keep them in position.

While this is the manner in which I prefer to carry out the invention, I do not limit myself to the use of auxiliary helices, but I may employ members consisting for example of straight or curved wires placed as chords across each helix or in any other suitable position.

Further, instead of placing the auxiliary helices with their axes parallel to the main helices I may locate them in any other suitable position within the helix.

Obviously in constructing this type of chain in a large size I may find it advantageous to use in place of each main helix a number of rings threaded onto the connecting pins in such a manner as to produce a structure substantially equivalent to that formed by a succession of helices.

In a construction in which it is necessary to use a number of helices in each link of the chain as indicated in Fig. 3, it is really these smaller helices that are effective in raising the liquid, the main helices chiefly serving to insure the mechanical continuity of the chain. This may obviously be secured in other ways, and Fig. 4 illustrates a means of accomplishing this end. In this case the helices 1 are omitted, the smaller helices 3 in each link being attached at their ends to plates 4. These are preferably also spaced apart by rods 5, adjacent links thus formed being joined together by pins 2, as in the construction above described.

Having now described my invention, what I claim as new and desire to secure by Letters Patent is:—

1. A chain for liquid raising apparatus of the type set forth comprising a series of interengaging helices wound alternately right and left handedly and arranged with their axes at right angles to the length of the chain.

2. A chain for liquid raising apparatus of the type set forth consisting of interengaging helices wound alternately right and left handedly and disposed with their axes at right angles to the length of the chain and connected by pins which are passed through the overlapping portions of adjoining helices.

3. In a chain as set forth in claim 2, extensions of the pins projecting on each side of the chain to engage a driving sprocket wheel.

4. A chain for liquid raising apparatus of the type set forth comprising a series of interengaging helices arranged with their axes at right angles to the length of the chain.

In testimony whereof I have signed my name to this specification.

JOHN CAMERON GRANT.

Witnesses:
　GEORGE S. KELSEY,
　WM. COYLE.